United States Patent
Gadre et al.

(10) Patent No.: US 6,259,479 B1
(45) Date of Patent: Jul. 10, 2001

(54) LETTERBOX FILTER APPARATUS AND METHOD

(75) Inventors: Shirish C. Gadre, San Jose; Taner Ozcelik, Fremont, both of CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

(21) Appl. No.: 09/096,321

(22) Filed: Jun. 11, 1998

Related U.S. Application Data (60) Provisional application No. 60/059,135, filed on Sep. 17, 1997.

(51) Int. Cl.[7] .............. H04N 7/01; H04N 11/20
(52) U.S. Cl. ............ 348/441; 348/444; 348/445; 348/450; 348/913; 348/642; 348/715
(58) Field of Search ............... 348/441, 444, 348/445, 446, 448, 450, 453, 913, 714, 715, 567, 642, 581; H04N 7/01, 11/20

(56) References Cited

U.S. PATENT DOCUMENTS

| | | | |
|---|---|---|---|
| 4,789,893 | * 12/1988 | Weston | 358/136 |
| 5,057,911 | * 10/1991 | Stec et al. | 358/11 |
| 5,208,669 | * 5/1993 | Richards | 358/140 |
| 5,212,550 | * 5/1993 | Park | 358/140 |
| 5,268,750 | * 12/1993 | Stec et al. | 358/11 |
| 5,331,346 | * 7/1994 | Shields et al. | 348/441 |
| 5,754,243 | * 5/1998 | Kurihara et al. | 348/445 |
| 5,781,241 | * 7/1998 | Donovan | 348/441 |
| 5,835,160 | * 11/1998 | Chen et al. | 348/441 |

OTHER PUBLICATIONS

Barry G. Haskell et al., *Digital Video: an Introduction to MPEG–2*, Chapman & Hall 1997, Chapter 5, pp. 80–109.

* cited by examiner

*Primary Examiner*—Reinhard J. Eisenzopf
*Assistant Examiner*—Jean W. Désir
(74) *Attorney, Agent, or Firm*—Wood, Herron & Evans, L.L.P.

(57) ABSTRACT

A method and apparatus for changing the number of scan lines in a frame of video data to produce an image represented by the video data that corresponds to a desired aspect ratio. The apparatus includes a pair of finite impulse response filters for processing the decoded chrominance and luminance pixel values stored in memory. The filters permit a plurality of scan lines of chrominance and luminance data to be read and filtered on a continuous basis with any scan line of data being read only once. Thus, the filters provide a very efficient method of providing a frame of a number of output scan lines of chrominance and luminance pixel values that are different from the number of scan lines of chrominance and luminance pixel values in a frame of video data stored in memory.

13 Claims, 3 Drawing Sheets

|  |  |  |  |  |  |  |  |
|---|---|---|---|---|---|---|---|
| $Y_{0,0}$ | $Y_{0,1}$ | $Y_{0,2}$ | $Y_{0,3}$ | $Y_{0,4}$ | $Y_{0,5}$ | $Y_{0,6}$ | $Y_{0,7}$ |
| $C_{0,0}$ | | $C_{0,2}$ | | $C_{0,4}$ | | $C_{0,6}$ | |
| $Y_{1,0}$ | $Y_{1,1}$ | $Y_{1,2}$ | $Y_{1,3}$ | $Y_{1,4}$ | $Y_{1,5}$ | $Y_{1,6}$ | $Y_{1,7}$ |
| $Y_{2,0}$ | $Y_{2,1}$ | $Y_{2,2}$ | $Y_{2,3}$ | $Y_{2,4}$ | $Y_{2,5}$ | $Y_{2,6}$ | $Y_{2,7}$ |
| $C_{2,0}$ | | $C_{2,2}$ | | $C_{2,4}$ | | $C_{2,6}$ | |
| $Y_{3,0}$ | $Y_{3,1}$ | $Y_{3,2}$ | $Y_{3,3}$ | $Y_{3,4}$ | $Y_{3,5}$ | $Y_{3,6}$ | $Y_{3,7}$ |
| $Y_{4,0}$ | $Y_{4,1}$ | $Y_{4,2}$ | $Y_{4,3}$ | $Y_{4,4}$ | $Y_{4,5}$ | $Y_{4,6}$ | $Y_{4,7}$ |
| $C_{4,0}$ | | $C_{4,2}$ | | $C_{4,4}$ | | $C_{4,6}$ | |
| $Y_{5,0}$ | $Y_{5,1}$ | $Y_{5,2}$ | $Y_{5,3}$ | $Y_{5,4}$ | $Y_{5,5}$ | $Y_{5,6}$ | $Y_{5,7}$ |
| $Y_{6,0}$ | $Y_{6,1}$ | $Y_{6,2}$ | $Y_{6,3}$ | $Y_{6,4}$ | $Y_{6,5}$ | $Y_{6,6}$ | $Y_{6,7}$ |
| $C_{6,0}$ | | $C_{6,2}$ | | $C_{6,4}$ | | $C_{6,6}$ | |
| $Y_{7,0}$ | $Y_{7,1}$ | $Y_{7,2}$ | $Y_{7,3}$ | $Y_{7,4}$ | $Y_{7,5}$ | $Y_{7,6}$ | $Y_{7,7}$ |

FIG. 3

ODD FIELD

|  |  |  |  |  |  |  |  |
|---|---|---|---|---|---|---|---|
| $Y_{0,0}$ | $Y_{0,1}$ | $Y_{0,2}$ | $Y_{0,3}$ | $Y_{0,4}$ | $Y_{0,5}$ | $Y_{0,6}$ | $Y_{0,7}$ |
| $C_{0,0}$ | | $C_{0,2}$ | | $C_{0,4}$ | | $C_{0,6}$ | |
| $Y_{2,0}$ | $Y_{2,1}$ | $Y_{2,2}$ | $Y_{2,3}$ | $Y_{2,4}$ | $Y_{2,5}$ | $Y_{2,6}$ | $Y_{2,7}$ |
| $Y_{4,0}$ | $Y_{4,1}$ | $Y_{4,2}$ | $Y_{4,3}$ | $Y_{4,4}$ | $Y_{4,5}$ | $Y_{4,6}$ | $Y_{4,7}$ |
| $C_{4,0}$ | | $C_{4,2}$ | | $C_{4,4}$ | | $C_{4,6}$ | |
| $Y_{6,0}$ | $Y_{6,1}$ | $Y_{6,2}$ | $Y_{6,3}$ | $Y_{6,4}$ | $Y_{6,5}$ | $Y_{6,6}$ | $Y_{6,7}$ |

EVEN FIELD

|  |  |  |  |  |  |  |  |
|---|---|---|---|---|---|---|---|
| $Y_{1,0}$ | $Y_{1,1}$ | $Y_{1,2}$ | $Y_{1,3}$ | $Y_{1,4}$ | $Y_{1,5}$ | $Y_{1,6}$ | $Y_{1,7}$ |
| $C_{2,0}$ | | $C_{2,2}$ | | $C_{2,4}$ | | $C_{2,6}$ | |
| $Y_{3,0}$ | $Y_{3,1}$ | $Y_{3,2}$ | $Y_{3,3}$ | $Y_{3,4}$ | $Y_{3,5}$ | $Y_{3,6}$ | $Y_{3,7}$ |
| $Y_{5,0}$ | $Y_{5,1}$ | $Y_{5,2}$ | $Y_{5,3}$ | $Y_{5,4}$ | $Y_{5,5}$ | $Y_{5,6}$ | $Y_{5,7}$ |
| $C_{6,0}$ | | $C_{6,2}$ | | $C_{6,4}$ | | $C_{6,6}$ | |
| $Y_{7,0}$ | $Y_{7,1}$ | $Y_{7,2}$ | $Y_{7,3}$ | $Y_{7,4}$ | $Y_{7,5}$ | $Y_{7,6}$ | $Y_{7,7}$ |

FIG. 4

LETTERBOX FILTER APPARATUS AND METHOD

This application is a continuation application of provisional application Ser. No. 60/059,135, entitled "Post Filter Hardware Design", filed Sep. 17, 1997.

FIELD OF THE INVENTION

This invention relates to the digital processing of video to be displayed on a television screen, and more particularly, to the processing of decoded video data in accordance with a desired aspect ratio.

BACKGROUND OF THE INVENTION

Recent times have seen an acceleration in efforts by suppliers of consumer electronics to greatly expand the amount and quality of information provided to users. The expanded use of multimedia information in communications and entertainment systems along with user demands for higher quality and faster presentations of the information has driven the communications and entertainment industries to seek systems for communicating and presenting information with higher densities of useful information. These demands have stimulated the development and expansion of digital techniques to code and format signals to carry the information.

With traditional television broadcast systems and other systems used for home entertainment, analog signals fill available bandwidths with single program real time signals in a straight forward format that includes much redundant information as well as much humanly imperceivable information. In contrast, digital transmission systems possess the ability to combine and identify multiple programs and to selectively filter out redundant or otherwise useless information to provide capabilities for the transmission of programs having higher quality or having higher useful information carrying ability or density. As a result of the high technological demand for such capabilities, advances toward the specification and development of digital communications formats and systems have accelerated.

In furtherance of these advances, the industry sponsored Motion Pictures Expert Group (MPEG) chartered by the International Organization for Standardization (ISO) has specified a format for digital video and two channel stereo audio signals that has come to be known as MPEG-1, and, more formally, as ISO-11172. MPEG-1 specifies formats for representing data inputs to digital decoders, or the syntax for data bitstreams that will carry programs in digital formats that decoders can reliably decode. In practice, the MPEG-1 standards have been used for recorded programs that are usually read by software systems. The program signals include digital data of various programs or program components with their digitized data streams multiplexed together by parsing them in the time domain into the program bitstreams. The programs include audio and video frames of data and other information.

An enhanced standard, known colloquially as MPEG-2 and more formally as ISO-13818, has more recently been agreed upon by the ISO MPEG. This enhanced standard has grown out of needs for specifying data formats for broadcast and other higher noise applications, such as high definition television (HDTV), where the programs are more likely to be transmitted than recorded and more likely to be decoded by hardware than by software. The MPEG standards define structure for multiplexing and synchronizing coded digital and audio data, for decoding, for example, by digital television receivers and for random access play of recorded programs. The defined structure provides syntax for the parsing and synchronizing of the multiplexed stream in such applications and for identifying, decoding and timing the information in the bitstreams.

The MPEG video standard specifies a bitstream syntax designed to improve information density and coding efficiency by methods that remove spatial and temporal redundancies. For example, the transformation blocks of 8×8 luminance pels (pixels) and corresponding chrominance data using Discrete Cosine Transform (DCT) coding is used to remove spatial redundancies, while motion compensated prediction is used to remove temporal redundancies. For video, MPEG contemplates Intra (I) frames, Predictive (P) frames and Bidirectionally Predictive (B) frames. The I-frames are independently coded and are the least efficiently coded of the three frame types. P-frames are coded more efficiently than are I-frames and are coded relative to the previously coded I- or P frame. B-frames are coded the most efficiently of the three frame types and are coded relative to both the previous and the next I- or P-frames. Headers in the bitstream provide information to be used by decoders to properly decode the time and sequence of the frames for the presentation of a moving picture. The video bitstreams in MPEG systems include a Video Sequence Header containing picture size and aspect ratio data, bit rate limits and other global parameters.

Video images to be viewed by a user are normally produced in a known manner by a scanning process across a video display. The choice of a particular scanning process to be used is generally a design trade off among contradictory requirements of bandwidth, flicker, and resolution. For normal television viewing, generally, an interlaced scanning process uses frames that are composed of two fields sampled at different times. Lines of the two fields are interleaved such that two consecutive lines of a frame, that is, a full display, belong to alternate fields. An interlaced scanning process represents a vertical temporal trade off in spatial and temporal resolution. Thus, slow moving objects are perceived with higher vertical detail, while fast moving objects are perceived with a higher temporal rate, although at half the vertical resolution.

The presentation of MPEG video involves the display of video frames at a rate of, for example, twenty-five or thirty frames per second (depending on the national standard used, PAL or NTSC, for example). Thirty frames per second corresponds to presentation time intervals of approximately 32 milliseconds. Thus, MPEG-2 video decoders must decode signals with interleaved video in what has been called, and referred to above as, the CCIR-601 (and which has also been called the ITU-R) color video format, where each pixel is coded as a luminance 8 bit value sampled at a 13.5 MHZ rate along with a red chrominance value and a blue chrominance value, 8 bits each and sampled at a 6.75 MHZ rate. In this format, the video frames are 720 pels per line, and either 480 lines per frame at 30 frames per second or 576 lines per frame at 25 frames per second.

In contrast to normal television display, computer video terminals often use non-interlaced, that is, progressive or sequential, displays with refresh rates of higher than 60 frames per second, for example, 72 frames per second. Generally, with computer displays, the viewer is sitting closer to the display and the material being displayed is often generally static. Thus, if an interlaced display is used as a computer display, one often experiences a large area of flicker, interline flicker, line crawling and other distractions. Generally, video signal processors are designed to specifically drive either a non-interlaced or an interlaced display monitor.

It is also known, pursuant to the MPEG-2 standard, that different video formats may be utilized in order to reduce the amount of data required. MPEG-2 video coding is optimized for the CCIR-601 4:2:2 interlaced format and, therefore, the 4:2:2 interlaced format is normally used in decoding video signals. In a MPEG-2 4:2:0 video format, the number of samples of each chrominance component, Cr or Cb, is one-half the number of samples of luminance, both horizontally and vertically. In contrast, with the MPEG-2 4:2:2 video format, in each frame of video, the number of samples per line of each chrominance component, Cr or Cb is one-half of the number of samples per line of luminance. However, the chrominance resolution is full vertically, that is, it is the same of that of the luminance resolution vertically. In the normal course of video signal processing, the 4:2:0 format is used, and that format is interpolated to a 4:2:2 format for the video display monitor.

In addition to the above variations, a video signal processor must be able to process video that has been derived from a wide range of sources. For example, the program material may be derived from 16 mm, 35 mm, or 70 mm film, cinemascope film, or wide screen film. Each of those film sources has a different display size, which is often calibrated in terms of its image aspect ratio, that is, the ratio of picture width to height. For example, the aspect ratio of 16 mm film, wide screen film, 70 mm film, and cinemascope film are 1.33, 1.85, 2.10, 2.35, respectively. The aspect ratio of NTSC, PAL, and SECAM TV is 1.33, whereas the aspect ratio for HDTV is 1.78. Given those variations in aspect ratio in combination with different sizes of video displays, it is often required to adjust the horizontal width or vertical height of the displayed image. Thus, the video signal processor must be capable of driving display monitors such that images having different aspect ratios may be displayed.

Known devices for performing a change in aspect ratio generally require a separate specialized processor, additional memory, as well as significant manipulation of the data. Such processors add cost, require too much overhead and introduce too much delay into the video processing function. Often, letterboxing requires that image lines be stored in the DRAM for a period of time while blank lines are being output. Such an operation wastes or does not most efficiently utilize the available memory. Other schemes create the letterbox image and write it to memory, and that stored letterbox video data is post filtered and output. Such a scheme doubles the number of memory reads after the video data has been decoded, thereby consuming valuable processing time. Thus, there is a need for device that more efficiently and economically automatically provides a desired aspect ratio.

SUMMARY OF THE INVENTION

The present invention provides letterbox filter hardware for the video data that does not require additional processors and operates at high speed. Further, the letterbox hardware provides a desired aspect ratio with minimal memory and with minimal memory reads. Further, the letterbox hardware functions as a continuous data pipeline passes the video data through a letterbox filtering process with a single memory read from memory and without requiring that a whole frame or field of video data be stored.

In accordance with the principles of the present invention and in accordance with the described embodiments, an apparatus is provided for changing a number of scan lines in a frame of video data to produce an image represented by the video data that corresponds to a desired aspect ratio. The video data is stored in a memory in the form of scan lines of luminance pixel values and scan lines of chrominance pixel values. The apparatus has a finite impulse response first filter and a CPU that provides instructions to the memory to successively read selected ones of the scan lines of chrominance pixel values therefrom. Those selected scan lines of chrominance pixel values are transfered to selected ones of a plurality of inputs of the first filter. The CPU provides instructions to the first filter to simultaneously process corresponding chrominance pixel values in the selected ones of the scan lines of chrominance pixels values to provide a number of output scan lines of output chrominance pixel values different from the number of scan lines of chrominance pixel values stored in the memory.

In one aspect of the invention, the apparatus further includes a finite impulse response second filter and the CPU provides instructions to the memory to read selected ones of the scan lines of luminance pixel values therefrom. The CPU causes the selected ones of the scan lines of luminance pixel values to be transferred to selected ones of a plurality of inputs of the second filter. The CPU then provides further instructions to the second filter to simultaneously process corresponding luminance pixel values in the selected ones of the scan lines of luminance pixels values to provide a number of output scan lines of output luminance pixel values different from the number of scan lines of luminance pixel values stored in the memory.

In another aspect of the invention the first filter is a finite impulse response 2-tap filter, and the second filter is a finite impulse response 4-tap filter.

In another embodiment of the invention, the invention provides a method comprising the steps of (a) reading selected ones of the scan lines of chrominance pixel values from the memory, (b) transferring a chrominance pixel value in each of the selected ones of the scan lines of chrominance pixel values to selected inputs of first multiplier hardware, (c) multiplying with the first multiplier hardware each chrominance pixel value on the selected inputs by respective first coefficients to provide resulting product values, (d) summing with first adder hardware, the resulting product values to produce a sum value; and (e) dividing with first division hardware, the sum value by a divisor to provide an output chrominance pixel value for a scan line of chrominance pixel values; and (f) iterating steps (b) through (e) for each of the chrominance pixel values in the selected lines of chrominance pixel values to provide output chrominance pixel values for a whole output scan line.

In another aspect of the invention, the above process is repeated using the luminance pixel values stored in the memory; and thereafter, the process is continuously repeated to provide a number of output scan lines of chrominance and luminance pixel values different from the number of scan lines of chrominance and luminance pixel values in the frame stored in the memory.

These and other objects and advantages of the present invention will become more readily apparent during the following detailed description together with the drawings herein.

DETAILED DESCRIPTION OF THE INVENTION

Figure 1:
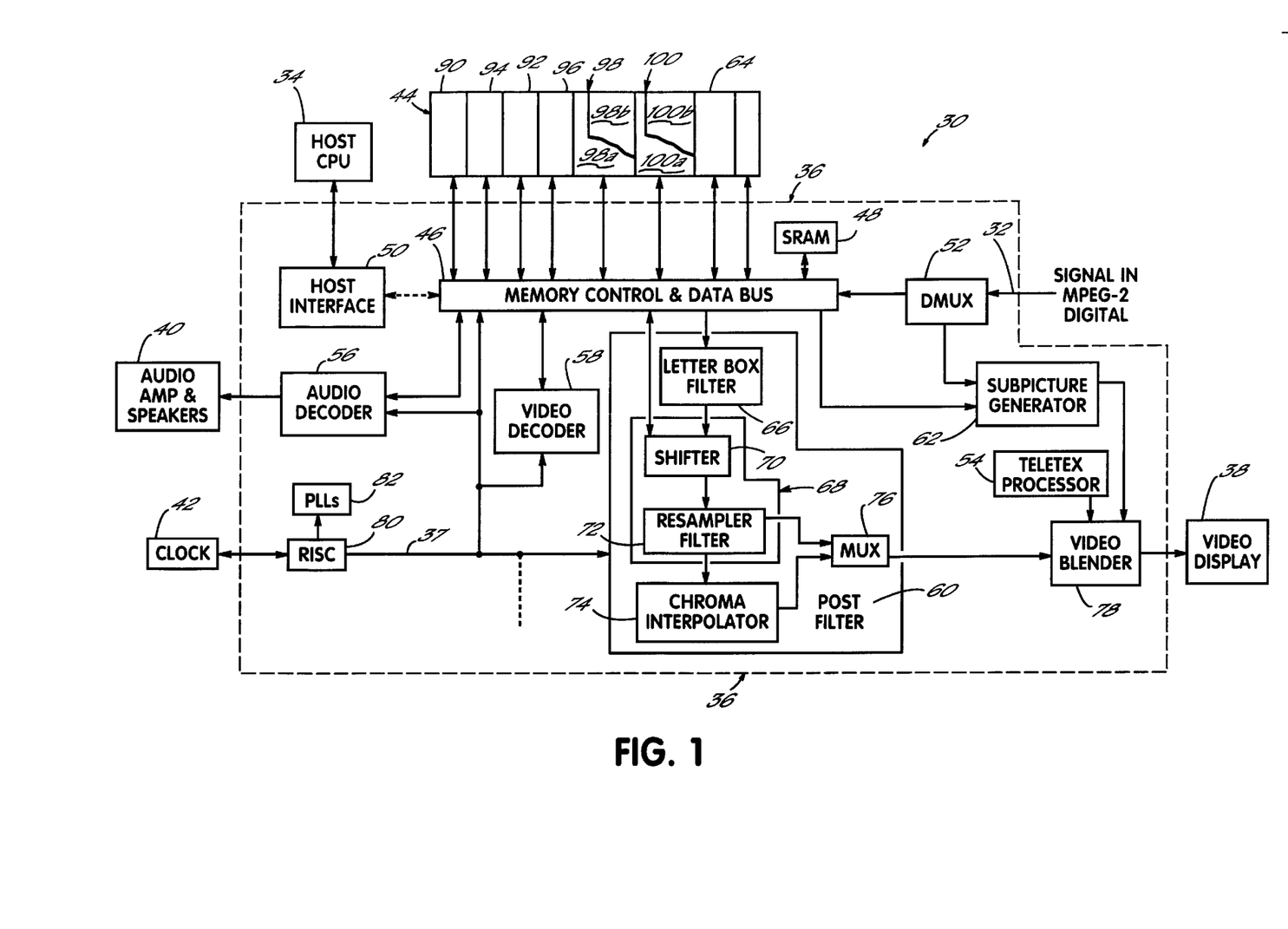
FIG. 1 is a schematic block diagram of a receiving and audio and video presentation system in accordance with the principles of the present invention.

One embodiment of the present invention is for use in high definition television (HDTV). FIG. 1 diagrammatically represents an HDTV receiving and audio and video presentation system 30, which includes a program signal input 32 in the form of an antenna, a cable, DVD, CD ROM or other medium through which an MPEG-2 digital input signal is received. A central processing unit or host CPU 34 which is programmed to process user commands from a control input device (not shown) operates a control system display which displays information, menu selections and other information to the user and which may or may not also function as an input device. An Application Specific Integrated Circuit or ASIC 36, when provided with configuration and selection information by the host CPU 34, decodes the raw signal from signal input 32 for output to the video and audio presentation devices 38 and 40, respectively. A local system clock 42 preferably is connected to the ASIC 36 and a buffer memory 44. The buffer memory 44 is in-line, sequential memory, such as dynamic random access or DRAM memory, and preferably includes a contiguous variable length buffer 44 for use by the ASIC 36 for audio signal processing.

The ASIC 36 is a single integrated circuit chip that is logically divided into a number of components or functions. The ASIC 36 includes a memory control and data bus 46, which has at least one received data input connection and a plurality of two-way data flow connections. One of the two-way connections is to a static random access memory or SRAM 48 of the ASIC 36. Another of the two-way connections is to a host interface unit 50 which connects externally with the host CPU 34, and another is to the DRAM memory module 44 which is external to the ASIC 36. The ASIC 36 includes a demultiplexer or DMUX 52 which has an input connected to the signal input 32 and an output connected to the received data input of the bus 46. The DMUX 52 has a text output connected to a teletex processor 54, that is also provided on the ASIC 36 for processing collateral information such as closed caption script and other such data.

The ASIC 36 further includes an audio decoder 56, a video decoder 58, a post filter 60 and a subpicture generating unit 62. The audio decoder 56 has an input side connected to the one of the two-way data connections of the bus 46 and an output connected to audio presentation subsystem 40. The video decoder 58 receives video program data via another of the two-way data connections of the bus 46, decodes and otherwise processes the received video data, and sends the decoded and partially processed video picture data back through bus 46 to a video buffer 64 in the DRAM memory 44. This processing preferably includes the application of motion compensation calculations and the construction of B-picture fields from buffered I and/or P frames and received B-picture data. The post filter 60 also processes the motion compensated pictures stored in DRAM 44 for output by the video presentation system 38.

The subpicture generating unit 62 generates local picture information that includes control menus, display bar-graphs and other indicia used in control interaction with the user. When a change of the aspect ratio is required in the vertical direction, decoded video data stored in the DRAM 44 is processed by the letterbox section 66 of the post filter 60. The letter box portion 66 is hardware that implements a finite impulse response (FIR) filter with downloadable coefficients that can either decimate or interpolate lines of video data the active area of a frame in selectable ratios, for example, a 4:3 ratio. A horizontal resampler 68 receives video data from either the letterbox filter 66 or directly from the memory 44 if no vertical filtering is required. The horizontal resampler 68 includes a shifter 70 and resampler filter 72 that can either decimate or interpolate, that is, reduce or increase the number of pixels in a horizontal line of video data. The shifter 70 receives video data from either the memory 44 or the letterbox filter 66 and functions to assemble and buffer the data for the resampler filter 72. The resampler filter 72 is a FIR 8-tap filter in which the central four coefficients are programmable. After resampling, the chrominance interpolator 74 provides a number of selectable modes of chrominance interpolation. A multiplexer 76 receives the video signal from the chrominance interpolator 74 or from the resampler 68 if no chrominance interpolation is required, and the multiplexer 76 provides a post filtered main video signal to a video blender 78. The video blender 78 combines the main video received from the post filter 60 with local video from the subpicture unit 62 and/or with teletex information from the teletex processor 54. The output of the blender 78 is connected to the video presentation subsystem 38.

The ASIC 36 is provided with a control bus 37 which is connected to the components in the ASIC 36. The ASIC 36 is also provided with a Reduced Instruction Set Controller or RISC 80, which serves as the local CPU of the ASIC 36. The RISC 80 controls the functions of the components of the ASIC 36 through control data ports connected to the control bus. The RISC 80 has a clock input that connects externally of the ASIC 36 to the system clock 42, and has another input connected to phase locked loop circuitry or PLLs 82 within the ASIC 36 used to time internal clock signals.

Figure 2:
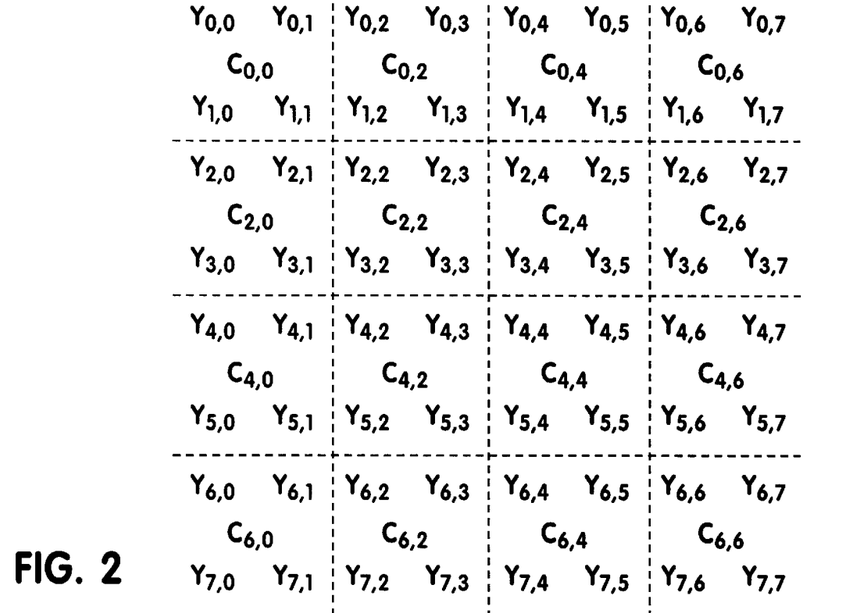
FIG. 2 is a diagrammatic representation of the upper left corner of a noninterlaced television picture of CCIR-601 4:2:0 chrominance format pixel luminance and chrominance data variables noted thereon.

An example of a video signal that the system 30 must decode is a two dimensional picture made up of blocks of 64 pels in an 8×8 square array as is illustrated diagrammatically in FIG. 2. Upon transmission, the data representing these pels is coded as a block by application of, for example, a Discrete Cosine Transform (DCT), which is decoded as a block at the receiver, that is, within the system 30. In FIG. 2, the luminance and chrominance are represented for a fully interleaved full frame picture, with each pel represented by a luminance value Y, designated $Y_{0,0} \ldots Y_{7,7}$ for the various rows and columns of the block, each of 8 bits, or 1 byte. In the example of FIG. 2, the coding is of the CCIR-601 4:2:0 chrominance format, that is, 2:1 horizontal and vertical subsampling has produced a signal having one chrominance data pair for each 2×2 group of 4 luminance values Y, for a total of 16 chrominance data pairs per block. Each chrominance data pair is represented by a chrominance pair value C, designated $C_{0,0}, C_{0,2}, \ldots, C_{6,4}, C_{6,6}$. Each of the chrominance data pairs includes an 8-bit blue chrominance value U and an 8-bit red chrominance value V. As a result, each 2×2 group of four pels is represented by 32 bits of luminance data and 16 bits of chrominance data, or 64 bytes of luminance data and 32 bytes of chrominance data per 8×8 pel block. As will be appreciated, the data may also be in the CCIR-601 4:2:2 chrominance format.

Figure 3:
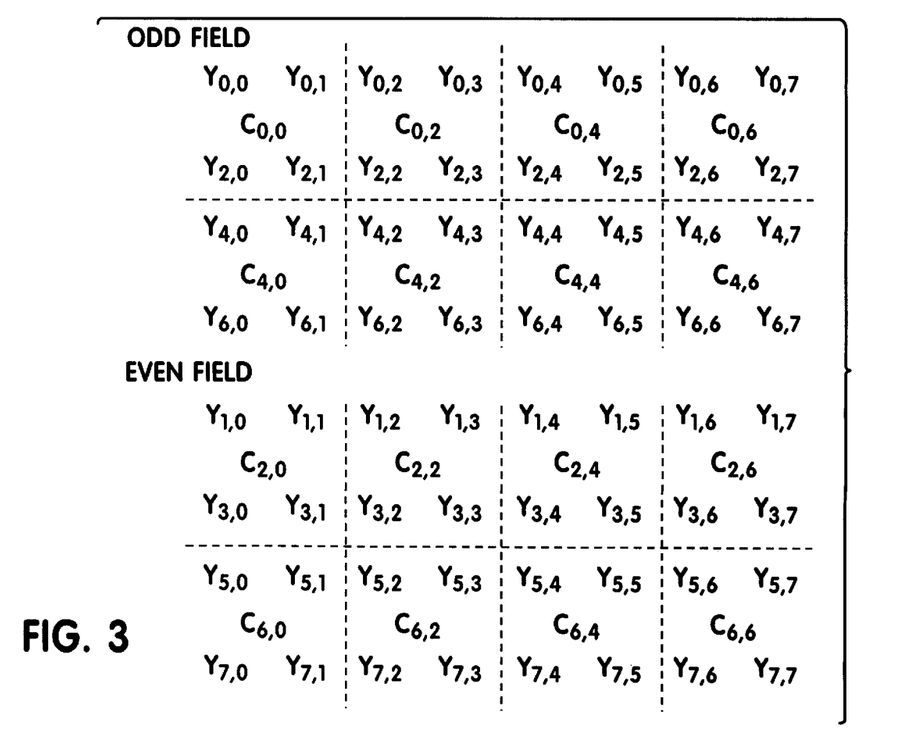
FIG. 3 is a diagrammatic representation of the upper left corner of an interleaved television picture of CCIR-601 4:2:0 chrominance format pixel luminance and chrominance data variables noted thereon.
Figure 4:
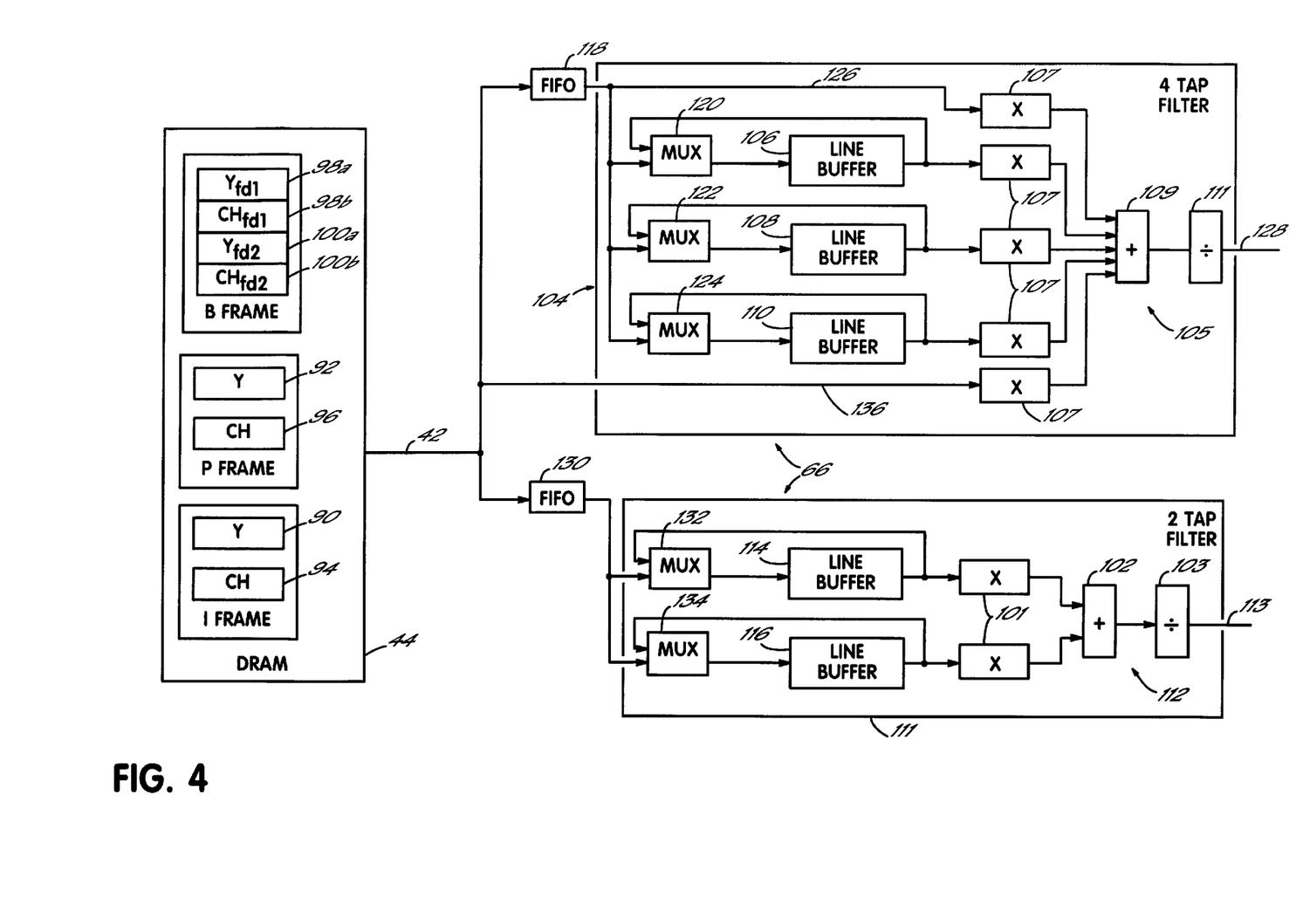
FIG. 4 is a schematic block diagram of hardware used to implement the letterbox filter in accordance with the principles of the present invention.

FIG. 3 illustrates coding in the CCIR-601 4:2:0chrominance format with the picture separated into top (even line)

and bottom (odd line) fields that are to be interleaved upon display as a full frame picture. The even or top field includes the even rows of luminance values $Y_0, Y_2, Y_4$ and $Y_6$ and the even rows of chrominance values $C_0$ and $C_4$. The odd or bottom field includes the odd rows of luminance values $Y_1$, $Y_3, Y_5$ and $Y_7$ and the even rows of chrominance values $C_2$ and $C_6$, with each chrominance pair corresponding to a 2×2 group of four luminance values of the same field. In FIGS. 3–4, the grid boxes group the luminance values to which each of the chrominance values in the boxes correspond.

Referring to FIG. 1, in accordance with known decoding techniques, decoded luminance data is stored in the memory 44 as full frame I or P pictures in buffer portions 90, 92, respectively. Similarly, decoded chrominance data is stored in the memory 44 as full frame I or P pictures in buffer portions 94, 96, respectively. The order of storage of the screen data in the buffers 90–96 begins at the upper left corner of the screen and each line is stored from the top to the bottom of the screen.

In the case of B-pictures, one field of luminance data of the picture is reconstructed at a time and stored in one half of a buffer 98. Two halves 98a, 98b of the buffer 98 respectively store the luminance values in alternate top and bottom fields. The buffer 98 is configured as a circular buffer with the two halves 98a, 98b thereof overlapping so that the size of the buffer 98 is slightly larger than one of the whole field portions 98a, 98b of the buffer 98. When either of the buffer halves 98a or 98b contains a complete reconstructed field, its size will be 0.50 of a full frame, and the buffer 98a or 98b containing the field will store the field data until the field is ready for display. When this occurs, the field data will be read from the buffer 98a or 98b, by scanning horizontally from top to bottom, with the scanned data being processed by post filtering section 60 of the video decoder and sent to the video presentation device 38 for display. When the presentation of one reconstructed B-picture field from buffer 98 is begun, the decoding and storing of the next field is simultaneously triggered. In a similar manner, one field of chrominance data of a B frame picture is reconstructed at a time and stored in one half of a buffer 100. Two halves 100a, 100b of the buffer 100 respectively store the chrominance data values for alternate top and bottom fields.

Video output and post-filtering can take place from either B-field buffers 98, 100 or from the I or P-frame buffers 90–96. The output and post-filtering from I or P-frame buffers takes place one field at a time, with odd or even rows being read from the buffer 90–96, depending on whether bottom or top field is being filtered and displayed. Within the chrominance memory sections of the DRAM 44, the video data is normally stored in a 4:2:0 format; and therefore, there is one sample per line of U, V chrominance pairs for every two samples per line of Y luminance data. The details of how the decoded video data is stored in memory are further described in copending application Ser. No. 09/001,129, now U.S. Pat. No. 6,088,047 entitled MOTION COMPENSATED DIGITAL VIDEO DECODING WITH BUFFERED REFERENCE PICTURE STORAGE, filed on Dec. 30, 1997, which application is owned by the assignee of the present application and, which application is in its entirety hereby expressly incorporated by reference herein.

As previously described, the aspect ratio of the composite video display represented by the video data stored in the memory 44 may vary as a function of the source of the video data. Further, the size of the video display unit may also vary, and therefore, the stored video data must be processed such that it matches the size of the display unit. The image sizes of various sources are identified with respect to their image aspect ratio, that is, the ratio of the width to the height of the image. Often the aspect ratio of the data stored in the memory 44 must be adjusted so that it corresponds to the size of the display monitor. For data having larger aspect ratios, the lines of data of the stored image must be reduced such that the entire image can be displayed.

Referring to FIG. 4, a vertical decimation filter 66 functions essentially as a pipeline between the decoded video data in memory 44 and further post-processing or post-filtering devices. For maximum efficiency, the vertical decimation components should operate at high speed, require minimal memory, and minimal memory reads. The letterbox filter 66 has a first luminance filter 104 including a finite impulse response ("FIR") 4-tap filter 105 having line buffers 106, 108, 110 on three of its inputs. The letterbox filter 66 further includes a second chrominance filter 111 having a FIR 2-tap chrominance filter 112 with line buffers 114, 116 on its two inputs. The line buffers 106–110 are capable of storing a full line of luminance data, that is, 720 bytes of luminance data; and the line buffers 114, 116 are capable of storing a full line of U and V chrominance pair values, which in the 4:2:0 format is 720 bytes.

The following describes an operation of the letterbox filter in response to an aspect ratio requiring a reduction of scan lines of 75%. At the start of a horizontal sync signal, instructions are provided to the memory controller to read a line of chrominance pixel values from one of the chrominance memory sections 94, 96, 98b and 100b. The memory section chosen is determined by the CPU as part of the decoding process. As the line of chrominance pixel values is read, it passes over bus 42, which is normally a 64 bit bus, and is temporarily stored in a first-in first-out memory ("FIFO") 130. The FIFO 130 is smaller in size then the line buffers 114, 116 and is used to decouple the timing of the memory 44 from the buffers 114, 116. A multiplexer, for example, multiplexer 134, transfers the line of chrominance values into the its respective buffer 116. Assuming a line of chrominance data was previously read into the buffer 114, each of the buffers 114 and 116 is recirculated; and as chrominance values for each pixel location are presented on the inputs of the 2-tap filter 112, those values are multiplied in first hardware multipliers 101 by programable and downloadable 9 bit coefficients to provide a resulting product values. The two tap filter 112 has two inputs and therefore, provides two resulting product values for each chrominance pixel value presented on the inputs. The two resulting product values are summed in first adder hardware 102 to provide a sum value associated with each chrominance pixel value; and the sum value is divided in first division hardware 103 by a number, for example, four; to provide a quotient value on an output 113 of the filter 112. The quotient value represents a filtered chrominance pixel value associated with the chrominance pixel values on the inputs. Thus, the line of chrominance data produced from the filter 112 is derived from a combination of two lines of chrominance data on the inputs of the filter 112.

After the line of chrominance pixel values is processed, a line of luminance pixel data processed by the filter 104. Assume three lines of luminance values were previously read from one of the luminance memory sections 90, 92, 98a and 100a and are stored in the respective buffers 106–110. As the first three lines of luminance values were read, they passed over bus 42, and were temporarily stored in a first-in first-out memory ("FIFO") 118 prior to being loaded in the buffers 106–110 by respective multiplexers 120–124. After the $1^{st}$, $2^{nd}$ and $3^{rd}$ lines of luminance data have been stored in the respective line buffers 106, 108, 110, a $4^{th}$ line of luminance values is provided on the fourth input 126 of the 4-tap filter 104. As the luminance values for successive pixel locations in the $4^{th}$ line are provided to input line 126 of filter 104, the buffers 106–110 are clocked to provide luminance values for corresponding pixel locations associated with the $1^{st}$–$4^{rd}$ lines of luminance data stored in the buffers 106–110.

Within the digital filter 104, the luminance values for the common pixel locations of the four lines of data are multiplied in second multiplier hardware 107 by respective programable and downloadable 9 bit coefficients to produce a set of resulting product values. The resulting product values in the set are summed in second adder hardware 103 to provide a sum value; and the sum value is divided in second division hardware 105 by a divisor, for example, 64, to produce a filtered luminance value on the filter output 128 associated with the luminance pixels values on the inputs of the multipliers 107. Thus, for each luminance pixel location in a scan line, the 4-tap filter 104 receives four luminance pixel values from four respective scan lines, multiplies those four luminance values by coefficients which generally have different values, sums the resulting products and divides the sum by a number to provide a filtered luminance pixel value on the output 128 of filter 104. In addition, as the $4^{th}$ line of luminance pixel values are transferred across the data bus 42 and input line 126, it is simultaneously via multiplexer 120, clocked into the line buffer 106 which contains the $1^{st}$ line of data read, that is, the oldest data. Further, as the $4^{th}$ line of luminance data is transferred pixel by pixel to input 126, the $2^{nd}$ and $3^{rd}$ lines of data are recirculated within their respective buffers 108 and 110 via respective multiplexers 122, 124. Thus, the $1^{st}$ line of luminance data to be provided on the output of the filter 104 is a composite of the first four lines of luminance data decoded and stored in the memory 44.

As previously described, another line of chrominance data is then transferred across bus 42 and into FIFO 130 and via multiplexer 132, into the chrominance line buffer 114 replacing the older line of chrominance data. The buffers 114, and 116 are recirculated, and the filtering or decimation process is performed on the chrominance data in those buffers to provide another line of chrominance data from the filter 112.

After processing another line of chrominance data, the $5^{th}$ line of luminance data is then read from the DRAM 44 and transferred over bus 42, into FIFO 118 and over input line 126 to the filter 104. As previously described, luminance data for each successive pixel location in the $5^{th}$ line is combined in the digital filter 104 with corresponding pixel luminance values for corresponding pixel locations in the $2^{nd}$, $3^{rd}$ and $4^{th}$ lines stored in the buffers 106–110. As the $5^{th}$ line is transferred over the input line 126, it is simultaneously input into buffer 108 displacing the oldest, that is, the $2^{nd}$ line of luminance data; and the data in buffers 106, 110 is recirculated through respective multiplexers 120 and 124. Thus, the $2^{nd}$ line of luminance data provided from the filter 104 is derived from the $2^{nd}$–$5^{th}$ lines of decoded luminance data stored in the DRAM 44.

The next line of chrominance data is then transferred across bus 42 and into FIFO 130 and via multiplexer 132, into the chrominance line buffer 116 replacing the older line of chrominance data. The buffers 114, and 116 are recirculated and the filtering or decimation process is performed on the chrominance data in those buffers to provide the next line of U and V chrominance data pairs from the filter 112.

In order to provide the necessary decimation with the further requirement that any line of data be read only once from the DRAM 44, it is necessary that two lines of luminance data next be fetched approximately simultaneously from the DRAM 44. However, the bandwidth of the system does not permit two lines of video to be sequentially read. Therefore, the fetching of two lines simultaneously is simulated by alternatively fetching portions of the two lines. For example, by first fetching the first four pixels of the $6^{th}$ line of luminance data from the memory 44 and storing that data in the FIFO 118, and thereafter, the first four pixels of the $7^{th}$ line of luminance data is read from the memory and presented to the filter 104 on input line 136. As the luminance data for each successive pixel location in the $7^{th}$ line is presented to the filter 46 on line 136, luminance data for corresponding pixel locations in the $6^{th}$ line is presented from the FIFO 118 on input line 126. Simultaneously, luminance data for corresponding pixel locations in the $4^{th}$ and $5^{th}$ lines from the buffers 106 and 108, respectively, are also presented to the filter 104; and a line of luminance data is provided from the filter 104 on line 128 derived from the $4^{th}$–$7^{th}$ lines of luminance data. The oldest stored data in buffer 110 which is the $3^{rd}$ line of data is not used. Further, as the luminance data in the $6^{th}$ and $7^{th}$ lines are provided on the input lines 126 and 136, respectively, those luminance data values are simultaneously entered into the line buffers 110 and 106, respectively, via the respective multiplexers 124, 120, thereby replacing the oldest stored data, that is, the $3^{rd}$ and $4^{th}$ lines. The above process is repeated by alternately fetching luminance data for four pixels from the $6^{th}$ line and then luminance data for four pixels for the $7^{th}$ line. By moving back and forth between the $6^{th}$ and $7^{th}$ lines, the luminance data may for corresponding pixels may be simultaneously presented to the filter 104 in a timely manner without having to read all of the $6^{th}$ line before fetching the $7^{th}$ line. Therefore, the filter 104 produces three lines of luminance data utilizing the first four lines of luminance data stored in the DRAM 44.

The above process then continuously repeats to alternately provide a scan line of chrominance pixel values and a scan line of luminance pixel values. In the case of luminance pixel values, sets of three successive lines of luminance values are provided from the digital filter 104 in response to fetching four scan lines of luminance data in a single line, single line, two lines fetch cycle from the memory 44.

The coefficients used by the digital filters 104 and 112 are determined analytically in accordance with known digital filter design techniques considering, for example, such specifications as cutoff frequencies, differentiation, roll off, ripple factor, etc. In addition, the coefficients may be empirically modified by observing the effects of the filtering process on the image, for example motion, as presented by the video display. After being finally determined, the sets of coefficients are programmed and stored in association different aspect ratios; and the coefficients are then selected and read as required by a currently active aspect ratio. The desired aspect ratio is a function of the aspect ratio programmed in the header block as well as the type and physical size of the video display. Different patterns of sequences of lines of video data to be fetched from the memory 44 and different sets of coefficients used in the filter 66 can be programmed as a function of the desired aspect ratio. Therefore, in response to a selected desired aspect ratio, the CPU selects a pattern of scan lines to be read from the memory 44 and downloads a set of coefficients to the filter 66.

Further, the pattern of which lines to be replaced in the buffers 106, 108, 110 can be represented by a 3-bit code pattern supplied by the RISC 80, and further, a series of 3-bit code patterns may be stored in a control register. Therefore, as each line of video data is read from the DRAM 44, a successive 3-bit code is read from the control register to instruct which of the line buffers is to be replaced with the new line of video data. As will be appreciated, the filters 104, 112 may also be used to interpolate, that is, add a line of video data between two lines of video data stored in the memory 44. Consequently, the filter 66 may be used to decimate or interpolate lines of video data and provide output lines of luminance and chrominance data that conform with a wide range of desired aspect ratios.

Thus, the letterbox filter 66 provides a change in the number of vertical lines of video data as required by the desired aspect ratio with a relatively simple hardware configuration that is relatively inexpensive and fast in its operation. After the coefficients are selected, other than the instructions that are required to read the lines of video data from memory, no other instructions of significance are required; and the 4-tap filter provides accuracy to ⅓ of a pixel luminance value. Further, the letterbox filter does not create any additional overhead for the memory 44 because each line of video data is read from the memory 44 only one time; and therefore, the system never has to fetch the same line twice. Thus, the above described letterbox filtering functions as a pipeline by filtering on-the-fly without introducing time delays.

While the invention has been illustrated by the description of a preferred embodiment and while the embodiment has been described in considerable detail, there is no intention to restrict nor in any way limit the scope of the amended claims to such detail. Additional advantages and modifications will readily appear to those who are skilled in the art. Therefore, the invention in its broadest aspects is not limited to the specific details shown and described. Consequently, departures may be made from the details described herein without departing from the spirit and scope of the claims which follow.

What is claimed is:

1. A method of changing a number of scan lines in a frame of video data to produce an image represented by the video data that corresponds to a desired aspect ratio, the scan lines of video data being stored in a memory in the form of scan lines of luminance pixel values and scan lines of chrominance pixel values, the method comprising the steps of:

reading selected ones of the scan lines of chrominance pixel values from the memory;

transferring the selected ones of the scan lines of chrominance pixel values to selected inputs of first multiplier hardware;

multiplying with the first multiplier hardware, each of the chrominance pixel values on the selected inputs by respective coefficients to provide a set of resulting product values, each resulting product value being associated with a chrominance pixel value in one of the selected scan lines;

summing with first adder hardware, the resulting product values in each set of resulting product values to produce a sum value for each set of resulting product values; and dividing with first division hardware, each of the sum values for the sets of resulting product values by a divisor to provide output chrominance pixel values in an output scan line, the selected ones of the scan lines and the coefficients being chosen to provide a number of output scan lines of output chrominance pixel values different from the number of scan lines of chrominance pixel values in the frame of video data stored in the memory.

2. The method of claim 1 further comprising the steps of:

reading selected ones of the scan lines of luminance pixel values from the memory;

transferring the selected ones of the scan lines of luminance pixel values to selected inputs of second multiplier hardware;

multiplying with the second multiplier hardware, each of the luminance pixel values on the selected inputs by respective coefficients to provide a set of resulting product values, each resulting product value being associated with a luminance pixel value in one of the selected scan lines;

summing with second adder hardware, the resulting product values in each set of resulting product values to produce a sum value for each set of resulting product values; and dividing with second division hardware, each of the sum values for the sets of resulting product values by a divisor to provide output luminance pixel values in an output scan line, the selected ones of the scan lines and the coefficients being chosen to provide a number of output scan lines of luminance pixel values different from the number of scan lines of luminance pixel values in the frame of video data stored in the memory.

3. A method of changing a number of scan lines in a frame of video data to produce an image represented by the video data that corresponds to a desired aspect ratio, the video data being stored in a memory in the form of scan lines of chrominance pixel values and scan lines of luminance pixel values, the method comprising the steps of:

(a) reading selected ones of the scan lines of chrominance pixel values from the memory;

(b) transferring a chrominance pixel value in each of the selected ones of the scan lines of chrominance pixel values to selected inputs of first multiplier hardware;

(c) multiplying with the first multiplier hardware each chrominance pixel value on the selected inputs by respective first coefficients to provide resulting product values, each resulting product value being associated with a chrominance pixel value in one of the selected scan lines;

(d) summing with first adder hardware, the resulting product values to produce a sum value; and (e) dividing with first division hardware, the sum value by a divisor to provide an output chrominance pixel value for a scan line of chrominance pixel values; and (f) iterating steps (b) through (e) for each of the chrominance pixel values in the selected lines of chrominance pixel values to provide output chrominance pixel values for a whole output scan line.

4. The method of claim 2 wherein after processing the selected ones of the scan lines of chrominance pixel values from the memory, the method further comprising the steps of:

(g) reading selected ones of the scan lines of luminance pixel values from the memory;

(h) transferring a luminance pixel value in each of the selected ones of the scan lines of luminance pixel values to selected inputs of second multiplier hardware;

(i) multiplying with the second multiplier hardware each luminance pixel value on the selected inputs by respective second coefficients to provide resulting product values, each resulting product value being associated with a luminance pixel value in one of the selected scan lines;

(j) summing with second adder hardware, the resulting product values to produce a sum value;

(k) dividing with second division hardware, the sum value by a divisor to provide a first output luminance pixel value for a scan line of luminance pixel values; and (l) iterating steps (h) through (k) for each of the luminance pixel values in the selected lines of luminance pixel values to provide output luminance pixel values for a whole output scan line.

5. The method of claim 4 further comprising the step of iterating steps (a) through (f) to provide a number of output scan lines of chrominance pixel values different from the number of scan lines of chrominance pixel values in the frame of video data stored in the memory.

6. The method of claim 5 further comprising the step of iterating steps (g) through (l) to provide a number of output scan lines of luminance pixel values different from the number of scan lines of luminance pixel values in the frame of video data stored in the memory.

7. The method of claim 6 further comprising reading selected ones of the scan lines of chrominance pixel values from the memory as a function of the desired aspect ratio.

8. The method of claim 7 further comprising providing the respective first coefficients as a function of the desired aspect ratio.

9. The method of claim 8 further comprising reading selected ones of the scan lines of luminance pixel values from the memory as a function of the desired aspect ratio.

10. The method of claim 9 further comprising providing the respective second coefficients as a function of the desired aspect ratio.

11. An apparatus for changing a number of scan lines of chrominance and luminance pixel values in a frame of video data to produce an image represented by the video data that corresponds to a desired aspect ratio, the video data being stored in a memory in the form of the scan lines of chrominance and luminance pixel values, the apparatus comprising:

a finite impulse response ("FIR") 2-tap filter comprising
first multiplier hardware for multiplying the chrominance pixel values on the inputs of FIR 2-tap filter by respective coefficients to produce resulting product values, first adder hardware for summing the resulting product values to produce a sum value, and first divider hardware for dividing the sum value by a divisor and providing a quotient value on output of the FIR 2-tap filter, the quotient value representing a filtered chrominance pixel value;

two buffer registers, each of the two buffer registers having an input in electrical communication with the memory and an output connected to an input of the FIR 2-tap filter;

a FIR 4-tap filter;

three buffer registers, each of the three buffer registers having an input in electrical communication with the memory and an output connected to an input of the FIR 4-tap filter; and a CPU providing instructions to the memory to successively read selected ones of the scan lines of chrominance and luminance pixel values therefrom and transfer the selected ones of the scan lines of respective chrominance and luminance pixel values to selected ones of the plurality of inputs of the FIR 2-tap and FIR 4-tap filters, respectively, the CPU providing further instructions to the FIR 2-tap and the FIR 4-tap filters to simultaneously process corresponding respective chrominance and luminance pixel values in the selected ones of the scan lines of the respective chrominance and luminance pixels values to provide a number of output scan lines of output chrominance and luminance pixel values different from the number of scan lines of chrominance and luminance pixel values in the frame of video data stored in the memory.

12. The apparatus of claim 11 wherein the FIR 4-tap filter further comprises:

second multiplier hardware for multiplying the luminance pixel values on the inputs of the FIR 4-tap filter by respective coefficients to produce resulting product values;

second adder hardware for summing the resulting product values to produce a sum value; and second divider hardware for dividing the sum value by a divisor and providing a quotient value on an output of the FIR 4-tap filter, the quotient value representing a filtered luminance pixel value.

13. The apparatus of claim 12 further comprising:

a first first-in, first-out buffer store connected between the inputs of the FIR 2-tap filter and the memory; and a second first-in, first-out buffer store connected between the inputs of the FIR 4-tap filter and the memory.

* * * * *

UNITED STATES PATENT AND TRADEMARK OFFICE
CERTIFICATE OF CORRECTION

PATENT NO.     : 6,259,479 B1
DATED          : July 10, 2001
INVENTOR(S)    : Gadre et al.

It is certified that error appears in the above-identified patent and that said Letters Patent is hereby corrected as shown below:

<u>Column 9,</u>
Line 6, reads "$1^{st}$-$4^{rd}$" and should read -- $1^{st}$-$3^{rd}$ --.

Signed and Sealed this

Eleventh Day of June, 2002

Attest:

JAMES E. ROGAN
Attesting Officer     *Director of the United States Patent and Trademark Office*